Patented Apr. 24, 1923.

1,453,069

UNITED STATES PATENT OFFICE.

WILHELM GAUS, WILHELM MEISER, AND ERNST EBERHARDT, OF LUDWIGSHAFEN-ON-THE-RHINE, GERMANY, ASSIGNORS TO BADISCHE ANILIN- & SODA-FABRIK, OF LUDWIGSHAFEN-ON-THE-RHINE, GERMANY, A CORPORATION OF GERMANY.

MANUFACTURE OF UREA.

No Drawing.    Application filed August 1, 1921.   Serial No. 489,070.

*To all whom it may concern:*

Be it known that we, WILHELM GAUS, WILHELM MEISER and ERNST EBERHARDT, citizens of Germany, residing at Ludwigshafen-on-the-Rhine, Germany, have invented new and useful Improvements in the Manufacture of Urea, of which the following is a specification.

According to the methods already known of producing urea by heating ammonia and carbon dioxid, or compounds of these gases, under pressure, the said gases are forced into an autoclave by means of a compressor, or previously compressed or liquefied and introduced, in this condition, into the said autoclave. In either case the compression required large and expensive apparatus. When the pressure is generated in the autoclave itself by charging it with solid ammonium carbamate, or carbonate, or with a mixture of ammonium bicarbonate and ammonia, and heating until urea is formed, the process is discontinuous and requires cooling of the autoclave for recharging after each single operation.

According to this invention urea may be manufactured without the use of any compressor or with only a small auxiliary compressor plant, by expelling the ammonia or carbon dioxid or both gases as required under pressure from solutions capable of giving them off, by means of heat. In order to carry this invention into effect, a highly concentrated solution of ammonium carbonate, or carbamate, for instance, may be forced into a column capable of resisting the pressure which column is indirectly heated by steam of about 12 atmospheres pressure. By the evaporation of ammonia and carbon dioxid so obtained, pressure is generated. The gas mixture comprising ammonia, carbon dioxid and some water vapor is passed through a cooler, capable of resisting the pressure, which is kept at a temperature high enough to allow condensation of a melt of ammonium carbamate (containing a small amount of water) but no solidification of the same which temperature may range between about 110 degrees and 150 degrees centigrade depending on the amount of water vapor present. The melt then runs into the autoclave where it is subjected to the temperature suitable for the production of urea, videlicet about 130 degrees to 150 degrees centigrade until the conversion no longer proceeds. The water contents of the melt can easily be maintained at a desired amount by suitably controlling the temperature of the column or of the coooler. By means of a similar regulation of the supply of solution to the column and of the temperature of the latter, the liquid leaving the column will be exhausted down to a very small degree and it can again be saturated with fresh ammonia and carbon dioxid and fed to the top of the column. The outlet of the latter is regulated with a view of allowing only the exhausted solution but no gas to escape. The autoclave may be filled and discharged either at intervals or continuously and the distillation can also be worked in single charges in which case a vessel capable of resisting pressure may be used instead of a column.

The mixture of ammonia and carbon dioxid remaining unaltered after the reaction is expelled from the urea solution and is used in the saturation of the liquid running off the column. In this way, a circulating system is established and any compression of gases completely replaced by the distillation under pressure.

Instead of starting from a solution of ammonium carbonate, the fresh ammonia and carbon dioxid or one of them required for the process, may be distilled separately in separate columns and either be brought together before entering the cooler, or be separately cooled, and be brought together before or in the autoclave. For example, ammonia can be generated from aqueous ammonia and the carbon dioxid from soda, or from ammonium bicarbonate solution or other compounds capable of giving off carbon dioxid, or one of the two gases may be forced into the autoclave by means of a compressor.

We claim:—

1. In the process of manufacturing urea by heating ammonia and carbon dioxid under pressure, the improvement which consists in bringing ammonia and carbon dioxid to the pressure required for the reaction by expelling them from suitable solutions by means of heat under pressure, and conveying them to the urea forming system.

2. The process of producing urea which consists in heating an ammonium carbonate solution under pressure, liquefying the vapors to form a melt of moist ammonium carbamate and heating the melt to urea-producing temperature, while still under the pressure generated by the expelling by heat.

In testimony whereof we have hereunto set our hands.

WILHELM GAUS.
WILHELM MEISER.
ERNST EBERHARDT.